United States Patent [19]

McCullough

[11] Patent Number: 4,992,774

[45] Date of Patent: Feb. 12, 1991

[54] METHOD FOR POWERING REMOTE VISUAL DISPLAYS AND ALLOWING FOR DATA EXCHANGE OVER THE SAME WIRE PAIR

[76] Inventor: Robert K. McCullough, 8236 E. 71st St., Suite 356, Tulsa, Okla. 74133

[21] Appl. No.: 302,663

[22] Filed: Jan. 27, 1989

[51] Int. Cl.⁵ .......................................... H04M 11/04
[52] U.S. Cl. .............................. 340/310 A; 340/310 R; 340/538; 375/22; 375/23
[58] Field of Search .............. 340/310 A, 310 R, 538, 340/825.06, 825.17, 825.29, 825.54, 505, 503; 455/73; 375/22, 23

[56] References Cited

U.S. PATENT DOCUMENTS

| | | | |
|---|---|---|---|
| 4,139,737 | 2/1979 | Shimada | 340/310 A |
| 4,228,422 | 10/1980 | Perry | 340/310 R |
| 4,408,185 | 10/1983 | Rasmussen | 340/825.54 |
| 4,535,401 | 8/1985 | Penn | 340/825.54 |

Primary Examiner—Joseph A. Orsino
Assistant Examiner—Kinfe-Michael Negash
Attorney, Agent, or Firm—Robert R. Keegan

[57] ABSTRACT

A novel way of powering a remote visual display and allowing data interchanges over the same wire pair. Such a station may be used for displaying the time, paging a person or an advertising message. The wire pair that powers a remote visual display also carries the electrically encoded message signal. On the same wire pair there is provision for the master message input station to exchange data with slave message input stations without message collision. Information from an input station key pad is captured by the microprocessor which converts the message to a serial binary signal. This signal drives a power transistor which converts a full wave rectified a.c. power current to a pulse width modulated signal which drives the wire pair connected to a remote visual display. The remote visual display power supply rectifies these signal pulses for power to drive the control circuits and display mechanism (light sources or light reflectors) and decodes the pulse width for display message information. The master message input station uses the time between pulses to exchange data with the slave message input stations.

15 Claims, 6 Drawing Sheets

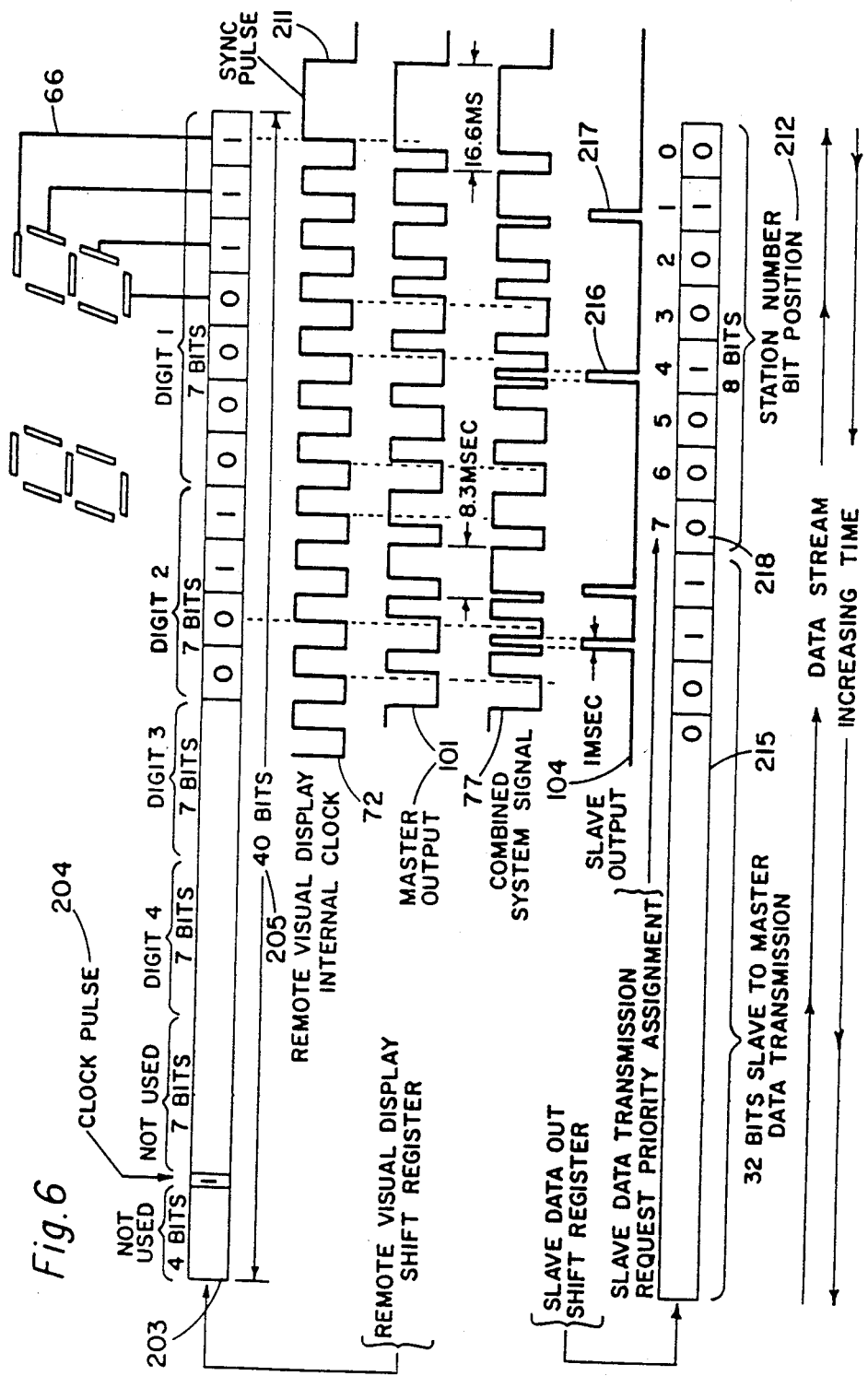

METHOD FOR POWERING REMOTE VISUAL DISPLAYS AND ALLOWING FOR DATA EXCHANGE OVER THE SAME WIRE PAIR

BACKGROUND OF THE INVENTION

The present invention relates to a visual display paging system which consist of one or more message input stations and one or more illuminated remote visual display stations for communicating messages to viewers. The present invention more particularly relates to a method for providing power and data exchange to a remote visual display over the same wire pair, especially to a method for sending message data which is rectified for power to drive a remote visual display and at the same time allowing the master message input station to receive message input data from slave input message stations connected to the same wire pair. This invention allows for a plurality of both input stations and output stations. These remote visual display paging systems may display either moving or stationary messages. There may be one or more slave message input stations that convey the message entered in a slave message input location to the master message station for eventual display on the remote visual display(s). The master message input station may store and sequentially display several messages or pages.

It has become more important in recent times to provide a simple, easy visual paging system to page a single person from a group of people. This person could be located in a crowd in an auditorium or in a restaurant or in a retail store. This type of visual paging system typically has the display located some distance from the message input station. In an auditorium or church the message input station may be in the sound control room or the nursery. The remote visual display is in front of the audience. The visual display paging system can be used to page a doctor to the phone or a mother to the nursery to attend to her child. The remote visual display is typically 100 to 400 feet away from the master message input station. In the restaurant application the remote visual displays may be in several eating areas some distance from the food pick-up area where the message input station is located. The visual display paging system could be used to page a customer or waitress to the food pick-up areas. In a retail store the message input station is typically located in a supervisors office while the displays are located through out the store and are easily visible by the store clerks. Store clerks or security personnel may be easily paged. Store systems can range up to 1000 feet between the input message station and the remote visual displays located where they can be seen by everyone.

Remote visual displays require both power and signal to operate. First, power must be supplied to operate both the display mechanism (light sources or light reflectors) and the serial data decoding circuits. Second, the serially encoded electrical signal conveying the message to be displayed must be supplied from an input station, computer or other source. Thirdly, provision must be made for data exchange between the master message input station and the slave message input stations.

The early installations of these displays required one wire between the message input station and the remote visual display for each visual element or light on the message board and one common return wire. The power required for the luminaire apparatus was supplied through these control wires from the input station. The message input station must be connected to the a-c power line or some source of power. This type installation is very expensive and time consuming. A typical installation required 15 wires and only displayed two numbers. Also, possible damage can result from miswiring.

Later developments in the art refined the system to require only one wire pair for the power and another wire pair for the signal. The serial signal sent by the message input station to the remote visual display is decoded and applied to the proper luminaire apparatus. A-C power must be provided to both the message input station and to the remote visual display. Although an improvement, this required four wires between the message input station and the remote visual display. Wire expense and the possibility of the installer damaging the system with mixed up wires during installation is a disadvantage. This happens often when the purchaser who is not skilled in the art installs his own system such as the case with a church. This has the further disadvantage in that if the power supply wires connect to a nearby a-c outlet then provision must be made to disconnect the power when the system is not in use. If the power wires come from a great distance then there is additional expenses because of the power supply wire length. The more sophisticated paging systems which accommodated one or more slave message input stations required a third wire pair for data exchange between the master message input station and the slave message input stations.

OBJECTIVE AND SUMMARY OF THE INVENTION

The object and novelty of this inventions is to supply both low voltage power and signal on the same wire pair to the remote visual display part of a visual display paging system.

Another object and novelty of this invention is to allow input message data to be interchanged between master message input station and slave message input stations on the same wire pair that is supplying both low voltage power and signal to the remote visual display.

Another object of this invention is to have the message sent from the master to be displayed on the remote visual display also displayed on all the slave message input stations at the same time.

Another object of this invention is to be able to enter or delete any message from any master or slave message input station.

A further object and novelty of this invention is a method of preventing message collision between the remote visual display, the master message input station and slave message input stations.

Another object of this invention is to provide a method for making installation easier since there is only one wire pair transmitting both power and signal from the message input station to the remote visual display. This wire pair when connected in a reverse manner will not damage the electric message display board. Installation is further simplified since only the message input station(s) require an a-c electrical outlet.

A further object of this invention is to provide a method to disconnect the power to the remote visual display during long periods of non use.

This invention is embodied in an apparatus for capturing and displaying messages more particularly for visually displaying changing messages on a remote visual display.

The apparatus comprises means for keyboard entry of a message, storage of that message in memory, transmission of the message and power to the remote visual display and data exchange between the master message input station and slave message input stations.

The operator types in a message on the keyboard which the microcomputer chip captures and stores in memory. The microcomputer converts the message stored in memory to a pulse width modulated serial data stream to be transmitted to the remote visual display. The microcomputer chip drives an emitter follower power output transistor which is connected to the remote visual display. The remote visual display rectifies this power pulse and stores this energy in a capacitor which supplies power to the decoding control circuits and the display mechanism (light sources or light reflectors). The remote visual display control circuit senses the pulse width and decodes this information to determine the message to be displayed. Because the data is pulsed, the time between pulses is available for data exchange between the master message input station and the slave message input stations.

In order to synchronize the serial data streams between the master and slave stations and prevent message collision the master sends out a synchronizing pulse after each complete pulse data stream of 40 pulses. Each slave is assigned a priority position and a time slot for a transmission-request bit. If a slave has data to be transmitted to the master then it will begin transmission after the sync pulse if there are no other slaves with a higher priority requesting transmission at the same time.

When the operator is finished and turns off the power to the master input station then the power ceases to be transmitted to the remote visual display. This achieves the power removal to the remote visual display during periods of non use.

This invention is embodied in an apparatus described herein for the purpose of paging mothers from a church service to the nursery when they are needed by their child. The master message input station is located in the nursery and the remote visual display is located in the auditorium or sanctuary. When the mother checks her baby into the nursery she is given a number. She then proceeds to the auditorium and can enjoy the sermon knowing that if she is needed by her child in the nursery the nursery worker can type in her child's number. The number will immediately appear in the auditorium on the remote visual display, whereupon the mother will respond by coming to the nursery. When she comes to the nursery the worker delets her number from the master message input station. For larger churches, one or more additional slave input message stations may be added in other nurseries. The numbers being displayed by the master message input on the remote visual display are also picked up and displayed by all the slave message input stations on their local display. This allows a person in another nursery to view all the currently displayed numbers. Also any number can be added or deleted from any of the slave input stations even though it was entered from another message input station. The master message input station can drive multiple displays and will page up to 7 mothers (numbers) at one time by displaying the numbers sequentially for about 3 seconds each. The system has the following benefits:

Easy installation
Multiple displays
Multiple input stations
Sequence through up to 7 paging numbers.

BRIEF DESCRIPTION OF THE DRAWINGS

FIG. 6 shows the detailed relationship of the pulse train on the system signal line. Also described here is a method of slave data collision avoidance.

DESCRIPTION OF THE PREFERRED EMBODIMENTS

Figure 1:
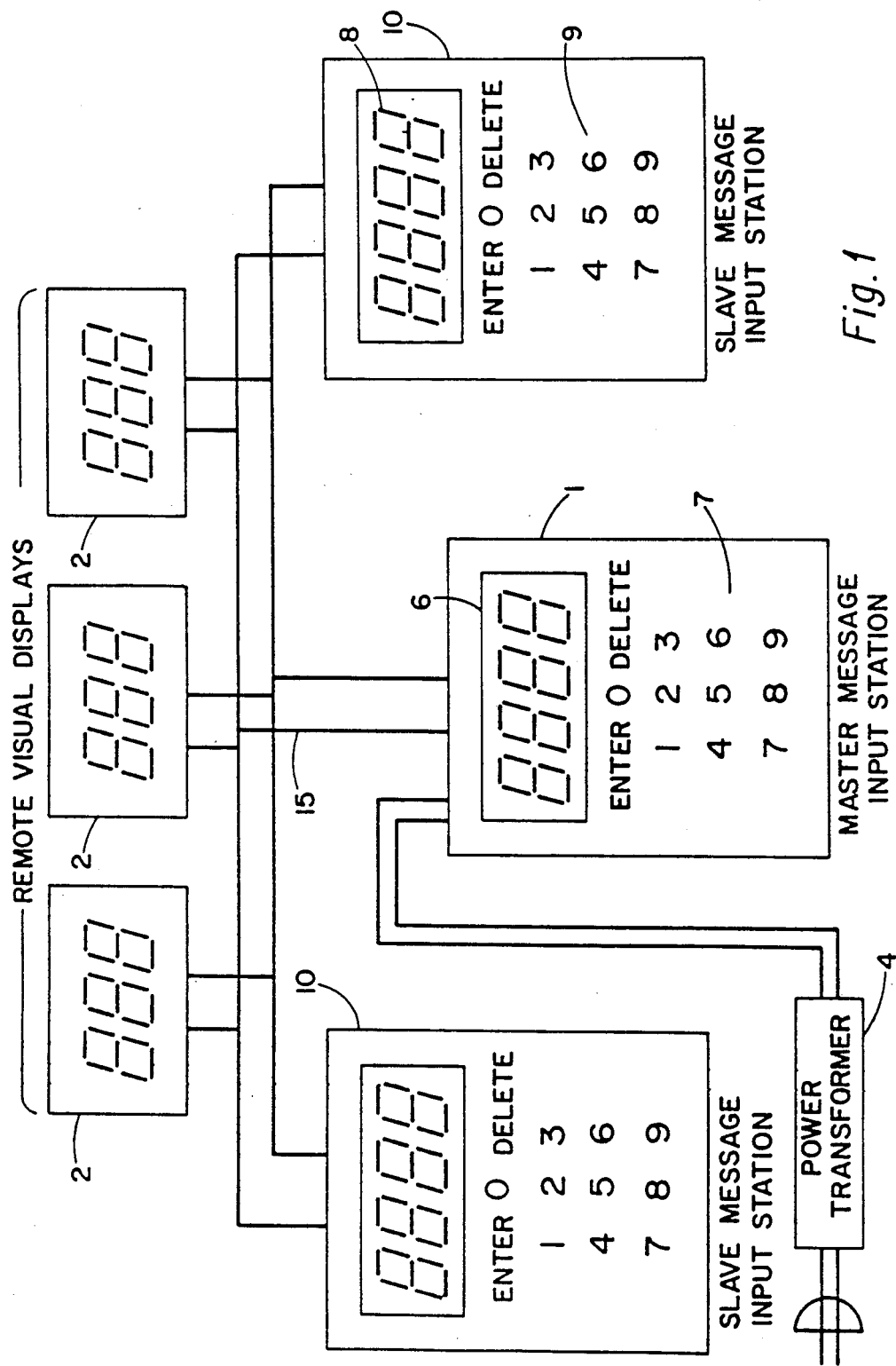
FIG. 1 shows an overview of a complete remote visual display system.

FIG. 1 shows an overall diagram of the visual display paging system. This consist of a master message input station 1 and a remote visual display 2. The master message input station also has a local visual display 6 so the operator can see what numbers he is entering on the key pad 7. The slave message input stations 10 also has a local visual display 8 so the current message can be viewed until the operator starts to enter a message at that slave input station keyboard 9, at which time the slave local visual display 8 shows the keys 9 being pressed by the operator. The entire system is connected on the same wire pair 15. This wire pair carries both power and signal to the remote visual displays 2 and may or may not carry power to the slave input station 10. For ease of installation this wire pair 15 is usually, but not necessarily, a coaxial cable such as RG59/U. The use of coaxial cable prevents the unskilled owner/installer from mixing up the interconnecting wires.

Figure 2:
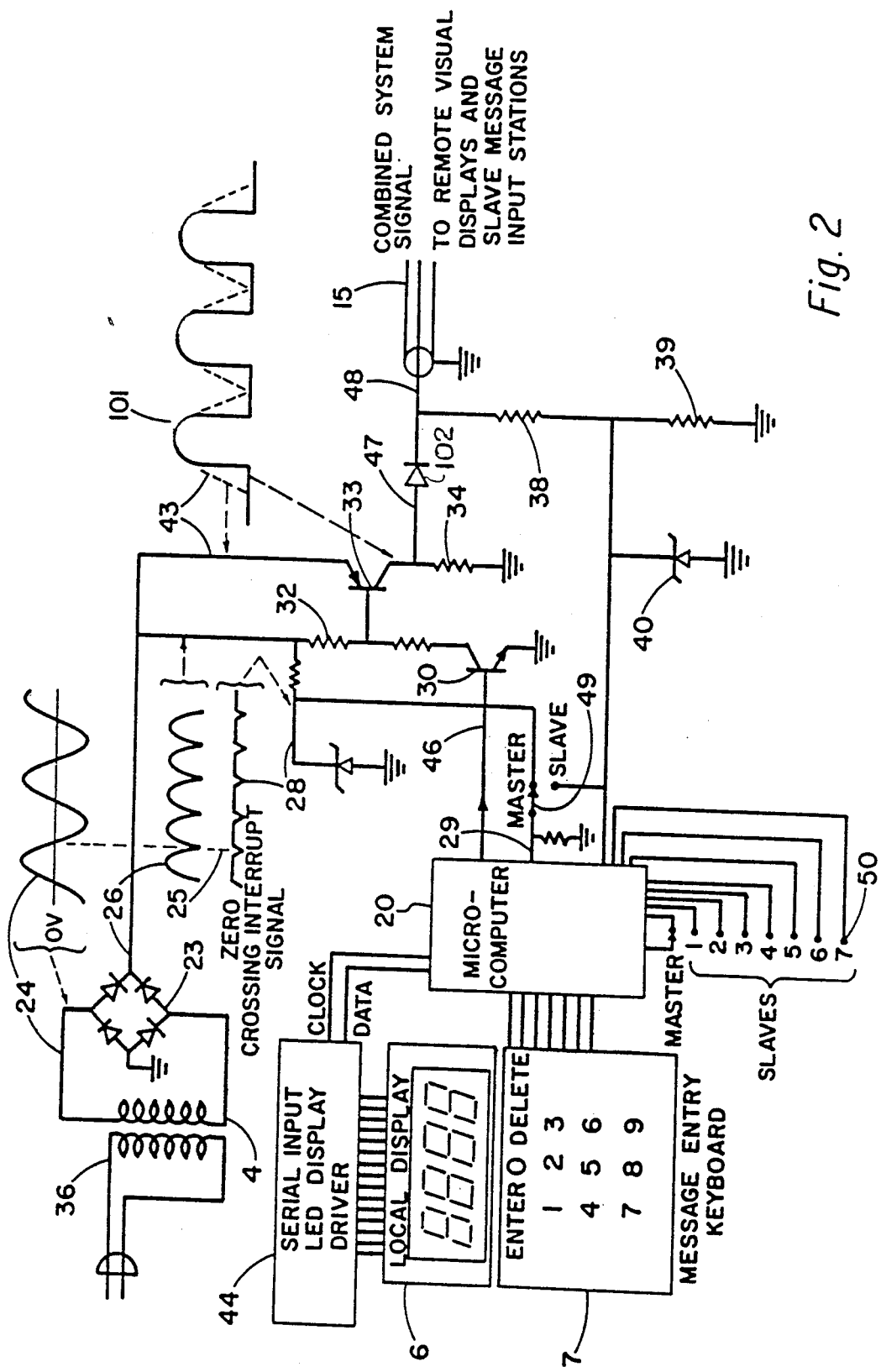
FIG. 2 shows in more detail the inner workings of the master message input station and the option changes necessary to make it a slave message input station.

FIG. 2 is a diagram of the master message input station. The message input ordinarily would come from a keypad 7. The microcomputer 20 scans the keypad 7 for a series of strokes, which constitutes the message, and records these strokes in memory. The a-c line voltage 36 is reduced by transformer 4 down to 24 volts and then applied to a bridge rectifier 23. The output of this bridge rectifier is not filtered with a capacitor but left in the half wave format to allow detection of the zero crossing 25 of the a-c line by the microprocessor 20. The microcomputer is interrupted by the zero crossing of the a-c line voltage 28 and allows the microcomputer to synchronize the peak output pulses 101 with the peak of the a-c line voltage 26, 43. Thus for each cycle on the a-c line there are two pulses output to the remote visual display. Therefore, 120 pulses per second are sent to the remote visual display.

The microcomputer 20 arranges the message captured from the keyboard 7 into a serial data stream of variable width pulses 101. In this embodiment each pulse is assigned to one particular segment or light on the display. In another embodiment these pulses may contain the address of a particular element in an array. If the pulse is wide then the segment is turned "ON"

and if the pulse is narrow then the segment is turned "OFF".

The low level 5 volt output signal 46 from the microcomputer 201's shifted to the 35 volt driving level by transistor 30. When the signal 46 out of the microcomputer 20 is low then transistor 30 is off and the base of transistor 33 is pulled high by resistor 32 thus shutting off transistor 33 and allowing the output 47 from the sending unit to be pulled to ground by resistor 34. When the output 46 of the microcomputer 20 is high then transistor 30 pulls the base of transistor 33 low and transistor 33 pulls it's collector high which pulls the output 47 high. Because the microcomputer is interrupted 29 by the zero crossing of the a-c line 25 it can time the output pulses 47 so that they coincide with the peaks of the a-c line 43. During these peaks is the only time that power is transferred from a rectifier to a capacitor in the ordinary power supply. The time between master station output pulses is used for data exchange between the master and slave stations FIG. 5 T20.

A local visual display 6 allows the operator to know what they have typed into the keyboard 7. As the microcomputer chip 20 recieves data from the keyboard 7 it arranges it in serial form and shifts it out to the display driver 44 which drives the local LED visual display 6.

The only hardware difference between a master message input station and a slave message input station is the position of switch 49 and 50. When in the switch 49 is the master mode the entire process is synchronized to the a-c line. When switch 49 is in the slave mode the microcomputer is synchronized to the system signal line 48 by means of the signal derived from the junction of resistors 38 and 39 and the 5 volt zener diode pulse clamp 40. This clamped system signal is connected to the microcomputer interrupt line 29 through switch 49 to allow the software to synchronize to the master message input station. The slave message input station software remains synchronized to the master station by the sync pulse FIG. 6 211 on the system signal line FIG. 2 48. The slave is also able to receive the number currently displayed on the remote visual display 2. It then displays this number on the local slave display 8 so the operator will know what numbers have been entered from other stations. The slave station reads what its slave number and priority are by means of switch 50. When the slave has a message to transmit to the master it uses this priority to establish transmission sequence as shown in FIG. 6 and described below.

Figure 3:
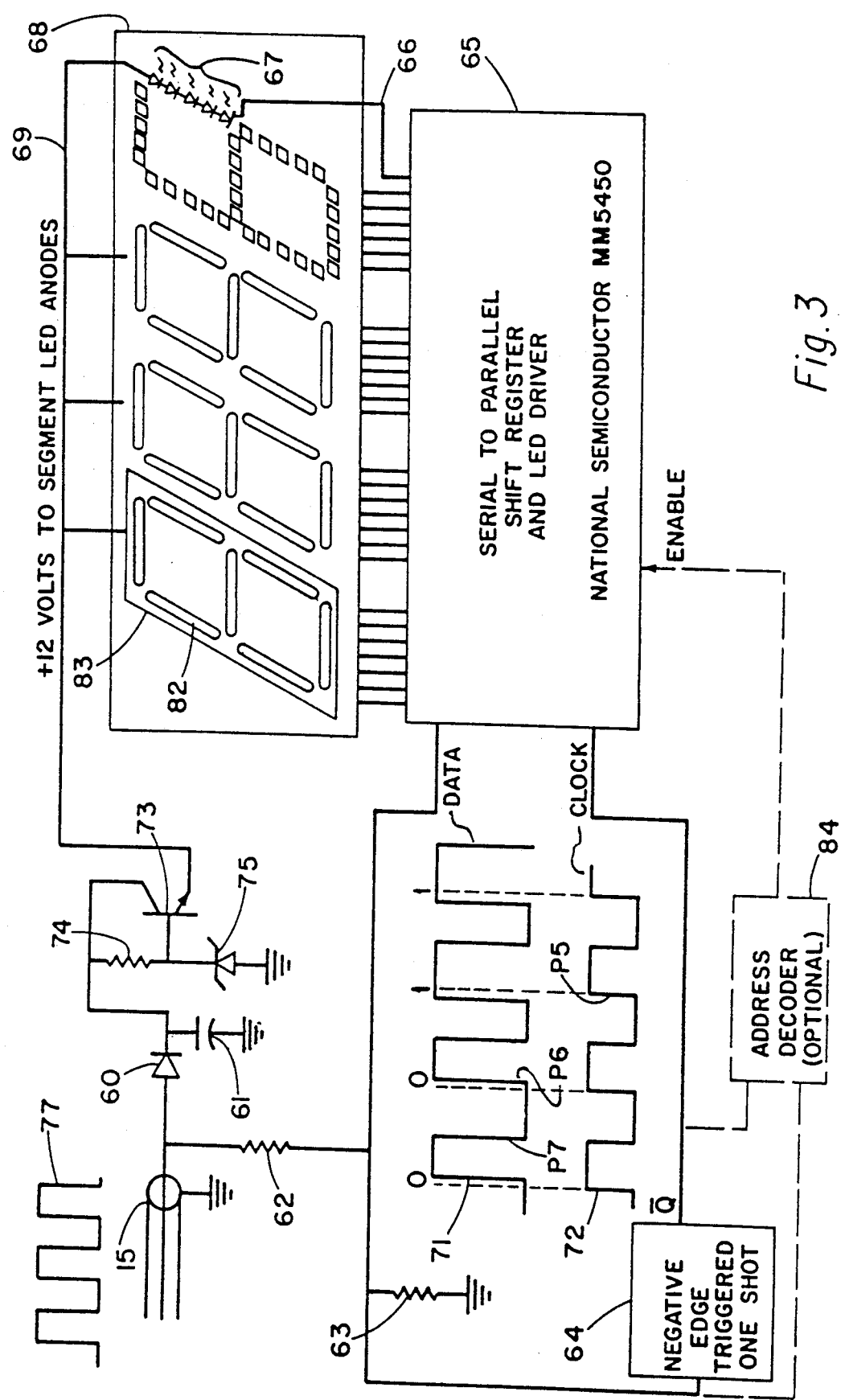
FIG. 3 shows the remote visual display overview and the method of deriving dc power from the signal sent by the master message input station.

FIG. 3 shows a remote visual display diagram. The power for the display is supplied by rectifying the message signal 77 coming from the master message input station. This signal is rectified by diode 60 and filtered by capacitor 61. This supplies the unregulated power to the lamp supply regulator transistor 73. Zener diode 75 sets the lamp voltage. Transistor 73 regulates the voltage applied to the lamp to 12 volts. This is applied to the anode of a series of 5 LED's 67. When the bit intended for that segment (5 LED's) is high, then the LED driver 66 pulls low causing current flow through the LED's 67 which causes them to light up.

The data is extracted from the input signal 77 by dividing down the system signal from the input lead through resistor network 62–63. The negative edge P7 is used to trigger a one shot timer 64 which produces a clock pulse 72. The negative edge triggered timer 64 triggers when the input signal 71 goes low at P7. This timer produces a positive pulse P5 exactly 2.5 milliseconds later. This pulse is used to clock in data from the input pulse 71 to the serial input display driver 65. If the signal pulse 71 goes low then returns high at time P5 in less than 2 milliseconds then the pulse is considered to be "ON" and that lamp is turned on. If the signal pulse 71 goes low then returns high after 3 milliseconds then the pulse (time P6) is considered to be "OFF" and that lamp is turned off. The microcomputer 20 encodes each pulse with the "on" or "off" information for one of seven segments 82 of each digit 83. The entire pulse string between synchronizing pulses is 40 pulses. Four digits times seven segments each is 28 pulses and the remaining 12 pulses are zeros which have no effect on the display but could be used to selectively address different displays 84.

Figure 4:
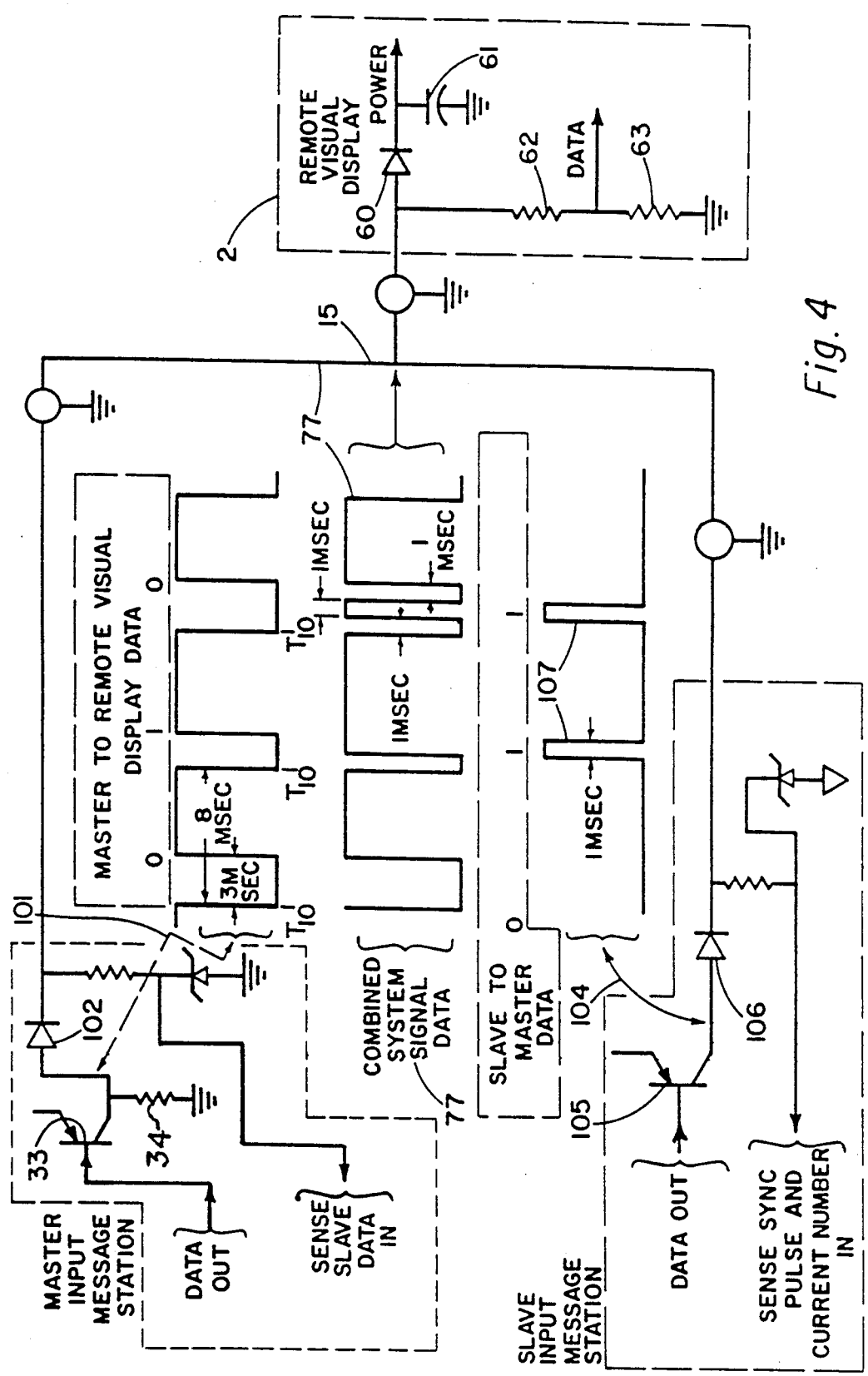
FIG. 4 shows how the system signal is combined from the master message input station and slave message input station signals using a diode-resistor "or" function.

FIG. 4 shows how the system signal 77 is combined from the master message input station and slave message input station signals. The master and slave stations combine their outputs 101 and 104 in a dioderesistor "or" function using diodes 102 and 106. When the output of the master station goes low T10 then if the slave station has data 107 to be placed on the system signal 77 line then it will go high 107 for 1 millisecond starting 1 millisecond after the master station's output goes low T10. The system signal 77 is connected to the remote visual display 2. The signal is rectified by diode 60 and filtered by capacitor 61 to supply power to the remote visual display. The data is provided by dividing down the system signal 77 with resistors 62 and 63 to drive the control circuits described in FIG. 3.

Figure 5:
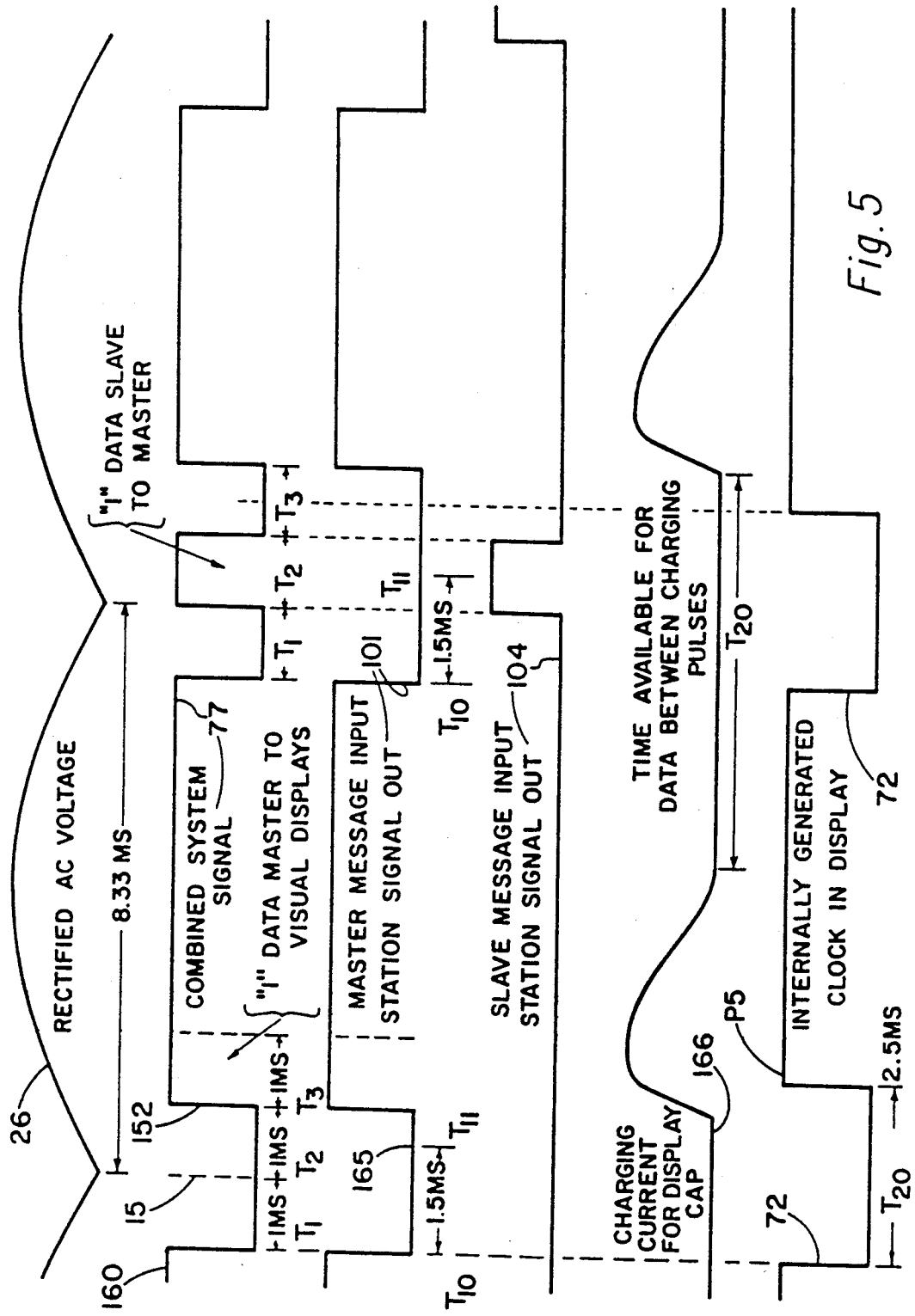
FIG. 5 shows the detailed composite system signal pulse requirements.

FIG. 5 shows the detailed composite system signal pulse requirements. The timing on one pulse of the system signal is described as follows. One complete cycle of the system signal is 8.33 milliseconds. One millisecond T3 is allotted to the remote visual display data communication. Another one millisecond time slot is allotted to the slave message input station data communications T2.

The master message input station signal 101 goes low T10. This signals the slave message input station to prepare for data transmission to the master station. One millisecond T1 after the negative edge T10 the slave message input station places a one millisecond wide pulse T2 on the system signal wire to transmit a "1" to the master message input station. If the slave message input station is transmitting a "0" then the signal will remain low 165 during this time. The master message input station samples the system signal wire 1.5 milliseconds T11 after the negative edge T10 and stores in memory whether the slave message input station data is high or low.

The one millisecond time period T3 is allotted for master message input station data transmission to the remote visual display. During this allotted time the master message input station places a high signal 152 on the system signal output line if the remote visual display segment assigned to this pulse is "on".

An ordinary bridge rectifier charging a capacitor only conducts heavy current during the peak of the a-c cycle. This peak or pulse charging current may only last for 2 to 3 milliseconds out of every 8.33 millisecond cycle. The remote visual display capacitor charging parameters are much the same. The master message input station output is a transistor switch 33 that turns "on" to connect the bridge rectifier 23 to the system signal line 45 hence the remote visual display during the peak of the a-c charging cycle 26. The charging current 166 is plotted against the a-c line voltage 26. It can be seen that the time between charging peaks T20 is available for other data transmission. One of the novelties of this invention is to use that time for data exchange. This time is used for slave message input station to master message input station data transfer T2 and for master message input station to remote visual display data transfer T3.

FIG. 6 shows the detailed relationship of the pulse train on the system signal line. Also described here is a method of slave data collision avoidance. The data streams are shown flowing from left to right. Time is shown increasing to the left. Therefore the first pulse out of the system is on the far right. The master message input station output 101 is the system clock and all pulse are synchronized to its falling edge. The remote visual display internal clock 72 pulses are generated by a negative edge triggered one shot 64 as described in FIG. 3. This clocks in the data to the remote visual display shift register, represented by 203 which in FIG. 6 or 65 in FIG. 3, stores 35 pulses and the 36th pulse 204 causes it to transfer its data to the display. This is more completely described in literature about the MM5450 LED display driver manufactured by National Semiconductor. One complete data stream is 40 bits long 205. Each bit is assigned to a particular segment on the display 66. The time between the negative edges on the master output data pulse 101 is 8.33 milliseconds. After every 40 data pulses 205 the slave output 104 is synchronized to the master output by a sync pulse 211. This sync pulse is double wide or 16.7 milliseconds between negative edges. The first 8 pulses after the sync pulse 212 are reserved for slave transmission request priority during time T2 in FIG. 5. Each slave is assigned at the factory a number 1 through 7 by means of a slider switch on the circuit board FIG. 2 50 inaccessible to the operator. This defines the salve number and it's priority for transmitting input message data to the master station. If slave station 1 and 4 both have a message to transmit to the master station in the same 40 bit data stream then they each place a data transmission request bit 216 and 217 in their appropriate shift register slot 213. Then after the 8th bit 218 each slave checks to see if any higher priority request have been made before they begin transmission on bit 9. In this case slave 1 would find no higher priority and would proceed to transmit its message 215 to the master station. However when slave 4 checks the priority request it would find slave 1 requesting transmission 217 and would hold its transmission until the next 40 bit cycle. The combined system signal is shown at 77.

I claim:

1. A system for providing both power delivery and signal transmission from a master station to a remote visual display comprising a master station having means for connecting to a power source of alternating current, means for rectifying the alternating current to produce a pulse waveform, a keyboard, a microcomputer having the keyboard connected for data input thereto, means for pulse width modulating said pulse waveform with a serial binary signal from said microcomputer including a power output transistor means, said microcomputer providing, in response to keyboard data input, a serial pulse width modulated signal from said power output transistor means;

a single wire pair connected to receive the output of said power output transistor means; and at least one remote station having a visual display and a serial to parallel shift register with its output connected to control said visual display, said shift register having an input coupled to said wire pair for receiving said serial binary pulse width modulated signal therefrom and for converting such signal to drive said visual display, and, in parallel with said wire pair, a capacitor charged by said modulated signal, said capacitor being connected to provide a direct current power source for said visual display.

2. A system according to claim 1 wherein said serial pulse width modulated signal from said power output transistor means is substantially a square wave varying from ground voltage level to a singular voltage level.

3. A system according to claim 1 wherein said power output transistor means includes, as the last stage thereof, an emitter follower.

4. A system according to claim 1 wherein there is a plurality of remote stations connected in parallel to said single wire pair.

5. A communication system as set forth in claim 1, having a plurality of remote stations with visual displays, each of said visual displays being effective to store energy from said power pulses and being universally responsive to pulses provided by the master station.

6. A system according to claim 1 wherein said master station includes a local visual display for displaying the data input from said keyboard.

7. A system according to claim 1 further including at least one slave message input station each having a keyboard, a microcomputer having the keyboard connected for data input thereto, means for generating a serial binary signal modulated under control of said microcomputer, and means for transmitting said signal over said single wire pair to the microcomputer of said master station.

8. A system according to claim 7 further including means for synchronizing said slave message input station to transmit signals to said master station in intervals between pulses of said pulse waveform.

9. A system according to claim 1 wherein said means for rectifying said alternating current is a full wave rectifier and the repetition frequency of said pulse waveform is twice the frequency of said alternating current.

10. A system for providing both power delivery and signal transmission from a master station to a remote visual display comprising a master station having means for connecting to a power source of alternating current, means for rectifying the alternating current to produce a pulse waveform, a microcomputer with means for providing data input thereto, means for pulse width modulating said pulse waveform with a serial digital signal from said microcomputer including semiconductor power output means, said micromputer, in response to data input, causing a serial pulse width modulated signal to be output from said semiconductor power output means;

a single wire pair connected to receive the output of said semiconductor power output means; and at least one remote station having a visual display means coupled to said wire pair for receiving said serial binary pulse width modulated signal therefrom and for converting such signal to drive said visual display, and a capacitor connected to said wire pair to be charged by said modulated signal, said capacitor being connected to provide a direct current power source for said visual display.

11. A system according to claim 10 wherein said serial pulse width modulated signal from said power output transistor means is substantially a square waveform.

12. A communication system as set forth in claim 10, having a plurality of remote stations with visual displays, each of said visual displays being effective to store energy from said power pulses and being universally responsive to pulses provided by the master station.

13. A system according to claim 10 wherein said master station includes a local visual display for displaying data input.

14. A system according to claim 10 further including at least one slave message input station each having a keyboard, a microcomputer having the keyboard connected for data input thereto, means for generating a serial binary signal modulated under control of said microcomputer, and means for transmitting said binary signal over said single wire pair to the microcomputer of said master station.

15. A system according to claim 14 further including means for synchronizing said slave message input station to transmit signals to said master station in intervals between pulses of said pulse waveform.

* * * * *